US011014485B2

(12) United States Patent
Cencer et al.

(10) Patent No.: US 11,014,485 B2
(45) Date of Patent: May 25, 2021

(54) VARIABLE STRAP LOCATION ON WHEEL RESTRAINT SYSTEM

(71) Applicant: TRINITY PARTS & COMPONENTS, LLC, Dallas, TX (US)

(72) Inventors: Robert J. Cencer, Tipton, MI (US); Paul K. Brown, Benbrook, TX (US); Chauncy D. Farrow, Arlington, TX (US); John T. Gilliam, North Richland Hills, TX (US); Jason L. Leatherman, Ponte Vedra Beach, FL (US); William R. Martin, Fort Worth, TX (US)

(73) Assignee: TRINITY PARTS & COMPONENTS, LLC, Dallas, TX (US)

( * ) Notice: Subject to any disclaimer, the term of this patent is extended or adjusted under 35 U.S.C. 154(b) by 0 days.

(21) Appl. No.: 16/345,288

(22) PCT Filed: Oct. 30, 2017

(86) PCT No.: PCT/US2017/058977
§ 371 (c)(1),
(2) Date: Apr. 26, 2019

(87) PCT Pub. No.: WO2018/081685
PCT Pub. Date: May 3, 2018

(65) Prior Publication Data
US 2019/0263312 A1  Aug. 29, 2019

Related U.S. Application Data

(60) Provisional application No. 62/415,301, filed on Oct. 31, 2016.

(51) Int. Cl.
*B60P 3/079* (2006.01)
*B60P 3/075* (2006.01)
*B60P 3/06* (2006.01)

(52) U.S. Cl.
CPC ............... *B60P 3/079* (2013.01); *B60P 3/075* (2013.01); *B60P 3/064* (2013.01)

(58) Field of Classification Search
CPC .......... B60P 3/079; B60P 3/075; B60P 3/064; B60P 3/077; B63B 25/008; B63B 2025/245; B61D 3/18; B65D 2585/686
(Continued)

(56) References Cited

U.S. PATENT DOCUMENTS

| 4,155,537 A | 5/1979 | Bronson et al. |
| 4,786,223 A | 11/1988 | Crissy et al. |

(Continued)

OTHER PUBLICATIONS

International Preliminary Report on Patentability for PCT Patent Application No. PCT/US2017/058977, dated May 9, 2019; 9 pages.
(Continued)

*Primary Examiner* — Stephen T Gordon
(74) *Attorney, Agent, or Firm* — Baker Botts, LLP (57) ABSTRACT

According to some embodiments, a wheel restraint system comprises a chock track coupled to a vehicle transport, an anchor mandrel, a ratchet mandrel, and a strap. The anchor mandrel is coupled to the chock track on a first side of a vehicle tire and comprises a pair of strap guides. The distance between the pair of strap guides is wider than the strap. The ratchet mandrel is coupled to the chock track on a second side of the tire. The ratchet mandrel comprises a ratchet for applying a rotational force and a slot for receiving the strap. The slot is wider than the strap. One end of the strap is coupled to the anchor mandrel and the other is inserted into the ratchet mandrel slot. Applying a rotational force to the ratchet mandrel produces a tightening force that tightens the strap around a portion of the vehicle tire.

5 Claims, 8 Drawing Sheets

(58) Field of Classification Search
USPC .................. 410/8–12, 19–23, 30, 50, 100
See application file for complete search history.

(56) References Cited

U.S. PATENT DOCUMENTS

| | | | | |
|---|---|---|---|---|
| 4,838,743 | A * | 6/1989 | Blunden | B60P 3/077 |
| | | | | 410/30 |
| 5,011,347 | A * | 4/1991 | Bullock | B60P 3/077 |
| | | | | 410/10 |
| 6,481,692 | B1 | 11/2002 | King | |
| 8,430,612 | B1 * | 4/2013 | Randall | B60P 3/075 |
| | | | | 410/3 |
| 2004/0144964 | A1 | 7/2004 | Boice | |
| 2006/0275095 | A1 | 12/2006 | Boydstun, IV et al. | |
| 2008/0170923 | A1 | 7/2008 | Tatina | |
| 2015/0210200 | A1 | 7/2015 | Vande Sande et al. | |

OTHER PUBLICATIONS

PCT International Search Report for International application No. PCT/US2017/058977—dated Jan. 29, 2018.
PCT Written Opinion of the International Searching Authority for International application No. PCT/US2017/058977—dated Jan. 29, 2018.

* cited by examiner

VARIABLE STRAP LOCATION ON WHEEL RESTRAINT SYSTEM

PRIORITY

This nonprovisional application is a U.S. National Stage Filing under 35 U.S.C. § 371 of International Patent Application Serial. No. PCT/US2017/058977 filed Oct. 30, 2017 and entitled "Variable Strap Location on Wheel Restrains System" which claims priority to U.S. Provisional Patent Application No. 62/415,301 filed Oct. 31, 2016 both of which are hereby incorporated by reference in their entirety.

TECHNICAL FIELD

The present disclosure relates generally to transports, and more particularly to a system and method for restraining a vehicle on a transport.

BACKGROUND

Automobile manufacturers often transport vehicles via railroad lines on multi-deck railcars, such as autoracks. In general, larger vehicles (such as trucks and SUVs) are transported on bi-level autoracks and smaller vehicles (such as compact cars and sedans) are transported on tri-level autoracks. Conventional systems for restraining vehicles during transport vary depending on the type of autorack. For example, bi-level autoracks typically employ wheel chocks that attach to steel wire grating panels fastened to the driving surface of a deck of the autorack ("bi-level vehicle restraint system"), while tri-level autoracks typically employ wheel chocks that attach to and are cantilevered over a raised "hat" shaped steel extrusion welded to the deck adjacent to the driving surface ("tri-level vehicle restraint system"). Moreover, bi-level vehicle restraint systems are often designed to effectively secure larger vehicles, but not smaller vehicles. And tri-level vehicle restraint systems are usually designed to effectively secure smaller vehicles, but not larger vehicles.

Passenger vehicles and light trucks are equipped with many different widths of tires. The tri-level wheel chock uses a strap to restrain the vehicle during transportation on a rail car. The strap is connected to an anchor mandrel or chock body. The strap is then placed over the tire's treads and is attached to a ratchet mandrel (which may be interchangeably referred to herein as a winch mandrel). The end of the strap is fed through a slot in the ratchet mandrel. The slot allows for the strap end to be pulled through, slack taken up and adjusted to length. The strap is then tightened by rotating the ratchet mandrel. This causes wrapping of the strap upon itself, which creates friction so that the strap cannot be pulled out of the slot.

In existing systems, the wheel chock, ratchet mandrel and anchor mandrels have a fixed location for the strap slot and strap anchor points. The wheel chock or vehicle restraint system is attached to a raised chock track. The Association of American Railroads (AAR) loading rules state that the vehicle's tire sidewall must not be any closer than ½" from the track sidewall with the optimum spacing of 2" from the track sidewall, which works well for medium and large sized tires. Vehicles are often parked off center to allow for driver's egress by increasing the driver's door swing clearance.

Vehicles with narrow tires using these AAR loading rules (or vehicles that are parked off center) often have the strap installed off the center of the tire treads (and sometimes on the shoulder of the tire treads). The shoulder of the tire tread has a radius that may cause the strap to slip off from movement developed during transportation. The strap is also equipped with rubber cleats designed to engage the treads of the tire to restrain the tire in the cross car direction and to prevent the strap from pulling off the tire in case of impact force induced yawing or truck hunting induced side-to-side motion. Often, these cleats are not engaged into a tire tread since the location of the centerline of the strap is fixed, and the vehicle cross car position varies. The strap on a shoulder of a tire or with the strap cleat not inserted into a tread may be worked off the tire tread easier.

SUMMARY

The teachings of the present disclosure relate to a system and method for restraining a vehicle. In certain embodiments, the size of a slot in a ratchet mandrel of a vehicle restraint system is increased to allow a strap's centerline to vary cross-car. In certain embodiments, a distance between strap guides of an anchor mandrel is increased in order to allow the strap on the anchor mandrel to slide cross-car a corresponding amount, to enable an operator to install the strap into a tire's tread and to better center the strap on the tire treads. In certain embodiments, the slot may be extended one or two inches, or any other suitable distance in either direction or outboard toward the chock track's sidewall.

According to some embodiments, a wheel restraint system comprises a chock track coupled to a deck of a vehicle transport, an anchor mandrel, a ratchet mandrel, and a strap. The anchor mandrel is coupled to the chock track on a first side of a vehicle tire and extends from the chock track towards a center of the vehicle transport. The anchor mandrel comprises a pair of strap guides. The distance between the pair of strap guides is wider than the strap. The ratchet mandrel is coupled to the chock track on a second side of the vehicle tire and extends from the chock track towards the center of the vehicle transport. The ratchet mandrel comprises a ratchet for applying a rotational force to the ratchet mandrel and a slot for receiving the strap. The slot is wider than the strap. The strap comprises a first end coupled to the anchor mandrel between the pair of strap guides and comprises a second end configured to be inserted into the slot of the ratchet mandrel. Applying a rotational force to the ratchet mandrel produces a tightening force that tightens the strap around a portion of the vehicle tire.

In particular embodiments, the wheel restraint system further comprises a cleat coupled to the strap. The cleat is configured to engage with a tread of the vehicle tire when the strap is tightened around the portion of the vehicle tire.

In particular embodiments, the slot of the ratchet mandrel is 1.5 or 2 times as wide as the strap. When the strap is tightened around the portion of the vehicle tire, the strap is not able to move in the side-to-side direction.

In particular embodiments, the wheel restraint system further comprises a second strap. The second strap comprises a first end coupled to the anchor mandrel within the strap guide and a second end configured to be inserted into the slot of the ratchet mandrel. Applying the rotational force to the ratchet mandrel produces the tightening force that tightens the second strap around the portion of the vehicle tire.

According to some embodiments, an anchor mandrel of a wheel restraint system comprises: a clamp portion configured to couple the anchor mandrel to a chock track coupled to a deck of a vehicle transport, and a mandrel portion coupled to the clamp portion. The mandrel portion comprises a pair of strap guides configured to position an end of a strap coupled to the anchor mandrel. The distance between the pair of strap guides is wider than the strap, facilitating sideways movement of the strap between the pair of strap guides.

In particular embodiments, a first strap guide of the pair of strap guides comprises a first raised portion of the mandrel proximate an end of the mandrel portion opposite the clamp portion, and a second strap guide of the pair of strap guides comprises a second raised portion of the mandrel between the first raised portion and the clamp portion. The first raised portion and the second raised portion are configured to limit sideways movement of the strap on the mandrel portion between the first raised portion and the second raised portion. In particular embodiments, the distance between the pair of strap guides is 1.5 or 2 times as wide as the strap.

According to some embodiments, a ratchet mandrel of a wheel restraint system comprises a clamp portion configured to couple the ratchet mandrel to a chock track coupled to a deck of a vehicle transport, and a mandrel portion coupled to the clamp portion. The mandrel portion comprises a slot configured to anchor an end of a strap to the ratchet mandrel. The slot is wider than the strap, facilitating sideways movement of the strap within the slot. The ratchet mandrel further comprises a ratchet portion coupled to the mandrel portion. The ratchet portion is configured to apply a rotational force to the ratchet mandrel. In particular embodiments, the slot is 1.5 or 2 times as wide as the strap.

Certain embodiments may have one or more technical advantages. As one example, certain embodiments may advantageously facilitate applying the strap to tires of varying sizes. As another example, certain embodiments may enable placing the strap away from the shoulder of the tire tread and facilitating the strap cleats to be placed into the tread. As still another example, certain embodiments may result in a greater force being required to cause the strap to slip off of the tire, which may advantageously keep the vehicle restrained during shipping. As yet another example, certain embodiments may no longer require vehicle loading to be as precise. Other technical advantages may be readily apparent to one of ordinary skill in the art. While specific advantages have been enumerated above, certain embodiments of the invention may include all, some, or none of the enumerated advantages.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein.

DETAILED DESCRIPTION

Particular embodiments of the present disclosure and its advantages are best understood by reference to FIGS. 1A through 7 of the drawings, like numerals being used for like and corresponding parts of the various drawings.

As described above, passenger vehicles and light trucks are equipped with many different widths of tires. The tri-level wheel chock uses a strap to restrain the vehicle during transportation on a rail car. The strap is connected to an anchor mandrel or chock body. The strap is then placed over the tire's treads and is attached to a ratchet mandrel (which may be interchangeably referred to herein as a winch mandrel). The end of the strap is fed through a slot in the ratchet mandrel. The slot allows for the strap end to be pulled through, slack taken up and adjusted to length. An operator tightens the strap by rotating the ratchet mandrel. This causes wrapping of the strap upon itself, which creates friction so that the strap cannot be pulled out of the slot.

In existing systems, the wheel chock, ratchet mandrel and anchor mandrels have a fixed location for the strap slot and strap anchor points. The wheel chock or vehicle restraint system is attached to a raised chock track. The Association of American Railroads (AAR) loading rules state that the vehicle's tire sidewall must not be any closer than ½" from the track sidewall with the optimum spacing of 2" from the track sidewall, which works well for medium and large sized tires. Vehicles are often parked off center to allow for driver's egress by increasing the driver's door swing clearance.

Vehicles with narrow tires using these AAR loading rules (or vehicles that are parked off center) often have the strap installed off the center of the tire treads (and sometimes on the shoulder of the tire treads). The shoulder of the tire tread has a radius that may cause the strap to slip off from movement developed during transportation. The strap is also equipped with rubber cleats designed to engage the treads of the tire to restrain the tire in the cross car direction and to prevent the strap from pulling off the tire in case of impact force induced yawing or truck hunting induced side-to-side motion. Often, the cleats are not engaged into a tire tread because the location of the centerline of the strap is fixed, and the vehicle cross car position varies. The strap on a shoulder of a tire or with the strap cleat not inserted into a tread may be worked off the tire tread easier.

The teachings of the present disclosure recognize that it is desirable to provide a system and method that facilitates varying the strap location of the wheel restraint system. According to one example embodiment, the slot in the cross-car direction for the strap in the ratchet mandrel is widened to facilitate varying the strap's centerline cross-car. In certain embodiments, the strap guides are moved out to facilitate the strap on the anchor mandrel to slide cross-car a corresponding amount, to enable an operator to install the strap into a tire's tread and to better center the strap on the tire treads. Tests on a static stand show that a properly tightened strap cannot be pulled cross car on the slotted ratchet mandrel. In certain embodiments, the slot may be extended 1" or 2" or some other suitable distance in either direction. In certain embodiments, the slot may be extended outboard toward the chock track sidewall.

The various embodiments described herein may be applied to any suitable vehicle restraint system. For example, the various embodiments described herein may be applied to the vehicle restraint system described in U.S. Pat. No. 9,375,814 to Jerry W. Vande Sande et al., filed Jan. 28, 2014 and issued Jun. 28, 2016, which is hereby incorporated by reference in its entirety.

Figure 1A:
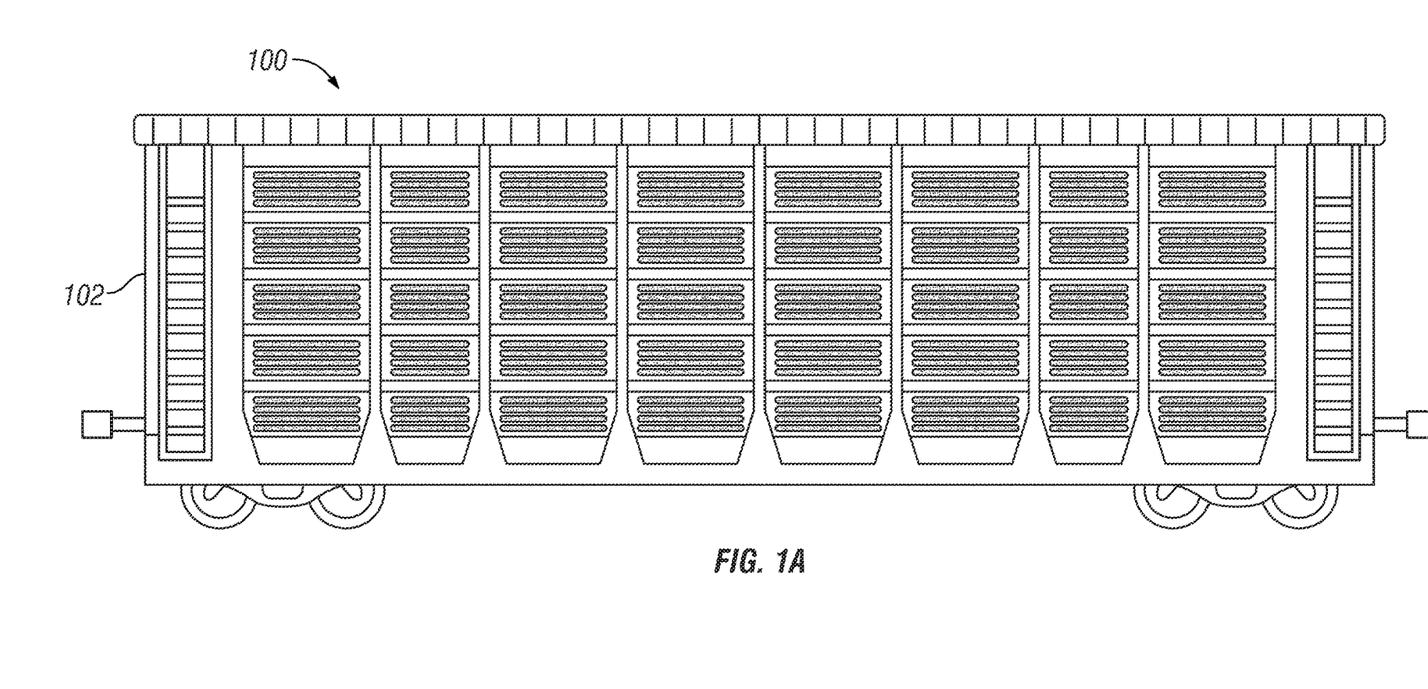
FIG. 1A illustrates a side view of an example transport of a system for restraining a vehicle, in accordance with certain embodiments.
Figure 1B:
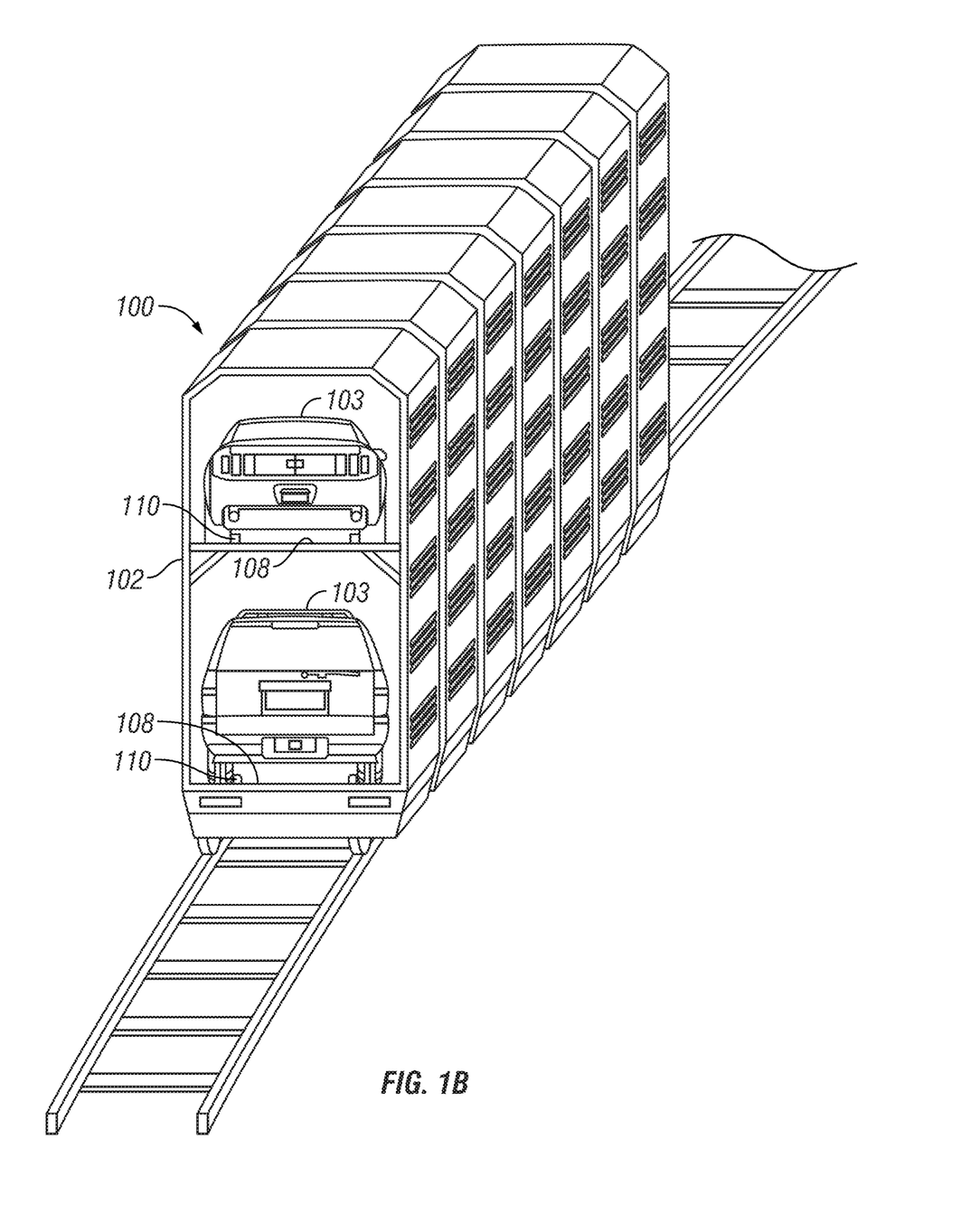
FIG. 1B illustrates a perspective view of an example transport of a system for restraining a vehicle, in accordance with certain embodiments.

FIGS. 1A through 1B illustrate a side view and a perspective view, respectively, of an example transport of a system for restraining a vehicle in accordance with an embodiment of the present disclosure. System 100 generally refers to a universal vehicle restraint system for securing vehicles during shipment. In particular, system 100 may be used to secure any type of vehicle having any width (e.g., vehicles of different track widths—a distance from the midline of one tire to the midline of the opposite tire and/or a distance between the outside tread edge of one tire and the outside tread edge of the opposite tire on the same axle) to a deck of a transport (e.g., a deck of an autorack). For example, a first type of vehicle, such as a car, with a first track width may be secured to the deck of the transport and a second type of vehicle, such as a truck, with a second track width (greater than the first track width) also may be secured to the deck of the transport. In other words, regardless of variations in wheel track width, both small vehicles and large vehicles may be secured to the same deck of a transport.

System 100 may be implemented in any type of autorack and/or other transport, such as a transport 102. A transport 102 may comprise any type of carrier capable of transporting vehicles 103 and may refer to an autorack 102. Example autoracks 102 may include railcars, trailers, tractor trailers, ships, airplanes, trucks, and/or any other carrier capable of transporting vehicles 103. In certain embodiments, an autorack 102 may be a convertible autorack that may be configured as a tri-level autorack (e.g., a railcar comprising three decks) and a bi-level autorack (e.g., a railcar comprising two decks). For example, a convertible autorack may be converted from a bi-level configuration to a tri-level configuration by adding a deck within the autorack. Alternatively, a convertible autorack may be converted from a tri-level autorack to a bi-level autorack by removing a deck from within the autorack.

In general, system 100 facilitates transporting vehicles 103 via transports 102. Examples of vehicles 103 may include cars (e.g., compact cars, sedans, etc.), jeeps, SUVs, trucks, buses, boats, aircrafts, any other automobile, any other machine having one or more tires, and/or any combination of the preceding. The present disclosure contemplates system 100 transporting any type of vehicle 103 of any size.

Transport 102 may include one or more decks 108 comprising tire guides 110. Although FIGS. 1A through 1B illustrate system 100 as including one transport 102, two vehicles 103, and two decks 108, system 100 may include any suitable number of transports 102, vehicles 103, and decks 108. Further, although particular examples of transports 102 have been described, this disclosure contemplates any suitable transports 102 comprising any suitable components configured in any suitable manner, according to particular needs.

Figure 2:
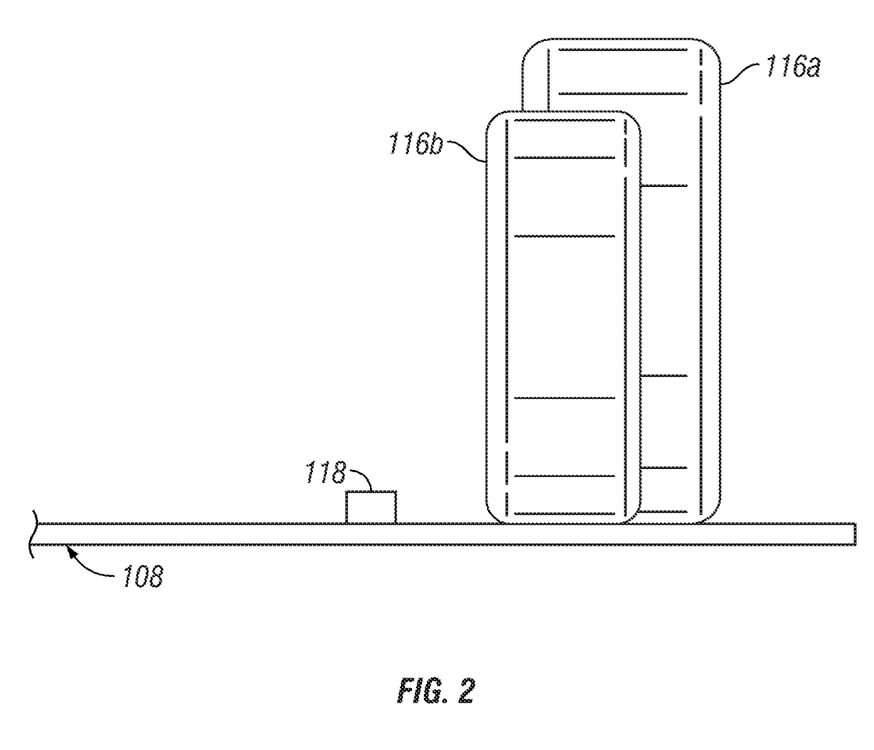
FIG. 2 illustrates an end view of an example deck of a system for restraining a vehicle, in accordance with certain embodiments.

FIG. 2 illustrates an end view of an example deck of a system for restraining a vehicle in accordance with an embodiment of the present disclosure. A deck 108 generally facilitates the loading, transportation, and/or unloading of vehicles associated with transport 102 (e.g., vehicles 103 being shipped via transport 102). Thus, deck 108 of transport 102 is configured to support one or more vehicles 103.

Deck 108 may be formed from steel and/or any other suitable material. Example decks 108 may include an adjustable deck of a convertible autorack, a removable deck of a convertible autorack, a deck of a tri-level autorack (e.g., a railcar comprising three decks), a deck of a bi-level autorack (e.g., a railcar comprising two decks), any other suitable deck, and/or any combination of the preceding. In other words, one or more decks 108 of a transport 102 may be adjustable and/or removable, and thereby may enable transport 102 to be used as a bi-level autorack and a tri-level autorack. According to various embodiments, deck 108 may be corrugated and may include a track assembly and/or a plurality of recesses. Alternatively, deck 108 may be non-corrugated and may include a plurality of slots and/or holes formed in one or more driving surfaces of deck 108.

In certain embodiments, deck 108 may include a plurality of slots and/or holes incorporated into a driving surface of deck 108 of transport 102 and configured to accommodate any type of vehicle 103. For example, slots and/or holes may be formed in a driving surface of a deck 108. As another example, slotted plates may each be positioned in one of the plurality of recesses.

As illustrated, deck 108 may also include chock track 118. Chock track 118 may be coupled to a top surface of deck 108 and may facilitate the loading and unloading of vehicles onto transport 102, as well as the restraining of vehicles once loaded. In some cases, vehicles may be required to be loaded with a particular spacing relative to chock track 118. For example, AAR regulations may require that a vehicle's tire sidewall must not be any closer than ½" from the sidewall of chock track 118, with the optimum spacing of 2" from the sidewall of chock track 118. In certain embodiments, chock track 118 may include a plurality of apertures, as described in more detail below in relation to FIG. 3.

In general, vehicles 103 of different widths may be loaded onto transport 102 and secured to deck 108. For example, a first vehicle having a first set of tires 116a may be larger than a second vehicle having a second set of tires 116b (e.g., the first vehicle may have a track width greater than the track width of the second vehicle, or the first vehicle may have the same track width but wider tires than the second vehicle). FIG. 2 illustrates tires 116a and 116b independent of vehicles 103 for purposes of comparing tire size and location.

Although particular examples of decks 108 and chock track 118 are described, this disclosure contemplates any suitable decks 108 and chock track 118 comprising any suitable components configured in any suitable manner, according to particular needs. In addition, decks 108 and chock tracks 118 may be separate from or integral to any component of FIG. 2. Moreover, it will be understood that transport 102 may include any number of decks 108 and may ship any number of vehicles. Furthermore, the present disclosure contemplates any type and any number of vehicles being secured to deck 108, for example via chock track 118.

Figure 3:
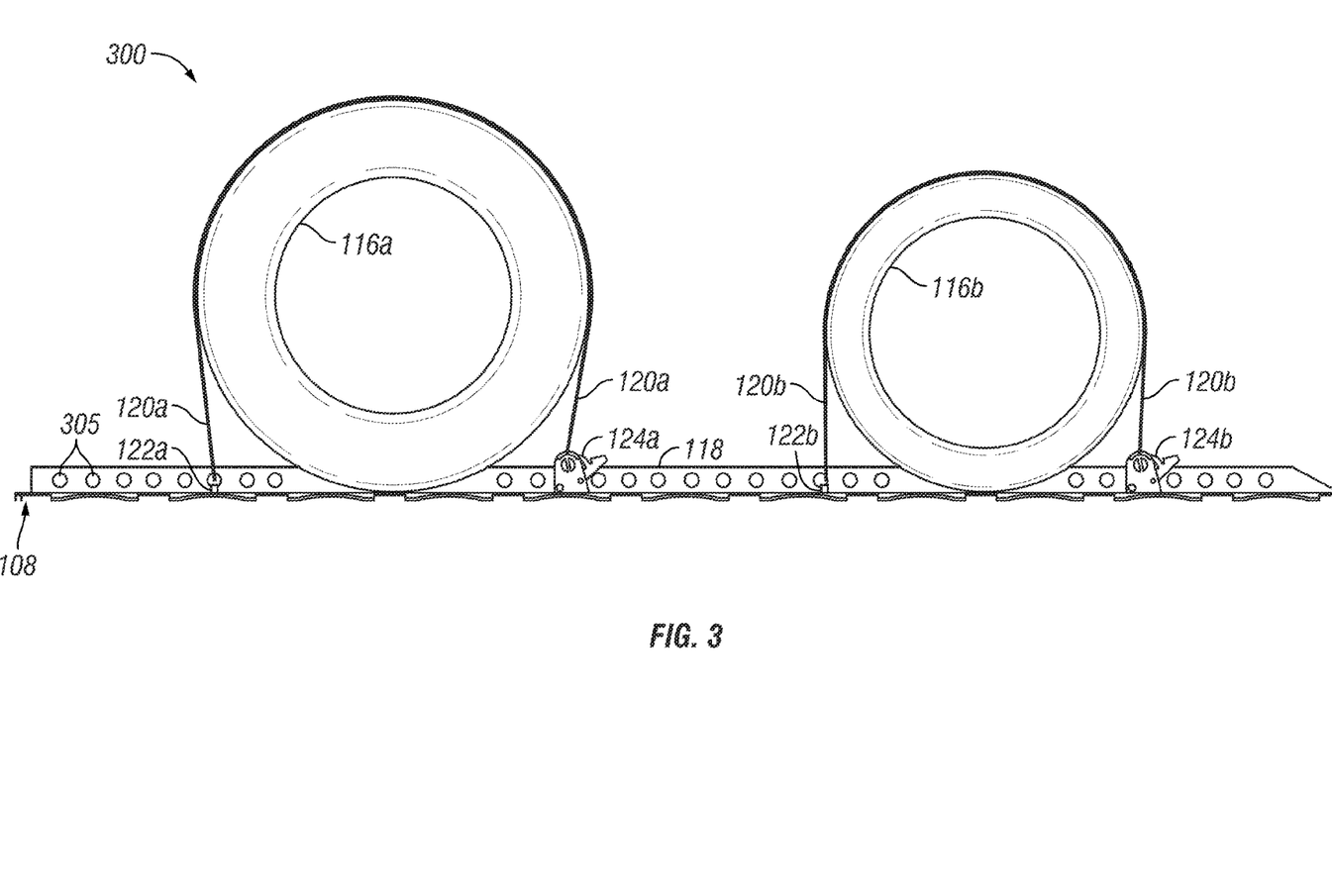
FIG. 3 illustrates a side view of an example system for restraining a vehicle, in accordance with certain embodiments.

FIG. 3 illustrates a side view of an example system for restraining a vehicle, in accordance with certain embodiments. System 300 may refer to a vehicle restraint system that may used to secure vehicles of different widths to one or more decks 108 of a transport 102, for example via chock track 118.

According to the illustrated embodiment, system 300 includes one or more straps 120, anchor mandrels 122, and ratchet mandrels 124 (which collectively may be referred to as one or more "strap assemblies"). Straps 120, anchor mandrels 122, and ratchet mandrels 124 may be configured to secure vehicles to deck 108. Anchor mandrels 122 and ratchet mandrels 124 may couple to chock track 118 through apertures 305 of chock track 118. The present disclosure contemplates that anchor mandrels 122 and ratchet mandrels 124 may couple to chock track in any suitable manner, for example via a locking pin.

Chock track 118 may include a plurality of apertures 305, which may accept anchor mandrels 122 and ratchet mandrels 124. The position of anchor mandrels 122 and ratchet mandrels 124 may be varied along chock track 118, for example to accommodate tires 116 and vehicles 103 of different sizes. In certain embodiments, chock track 118 may be coupled to a top surface of deck 108. Alternatively, chock track 118 may be integral to deck 108.

Strap 120 of the strap assembly shown in the example of FIG. 3 may be configured to be positioned on a portion of a tire of a vehicle, such as tires 116a and 116b, to secure the tire of the vehicle to deck 108. Example straps 120 may be composed of one or more of nylon, rubber, cloth, and/or any other suitable material. In certain embodiments, strap 120 may include one or more cleats with raised fins and may be reversible (as described in more detail below with respect to FIG. 7). According to the illustrated embodiment, a first end of strap 120 is coupled to anchor mandrel 122 and a second end of strap 120 is coupled to ratchet mandrel 124.

Anchor mandrel 122 of the strap assembly illustrated in the example of FIG. 3 may be configured to be coupled to an aperture 305 of chock track 118. For example, anchor mandrel 122 may be coupled to a first aperture 305 on a first side of a tire of a vehicle, such as tire 116a and/or tire 116b. System 100 typically utilizes anchor mandrel 122 to secure one end of strap 120 to chock track 118. Anchor mandrel 122 may include a plurality of strap guides (described in more detail below with respect to FIG. 6). In certain embodiments, a distance between the strap guides may be increased in order to allow an operator to move strap 120 to enable installation of strap 120 into the tread of tire 116 and better center the strap on the tire treads.

Ratchet mandrel 124 of the strap assembly illustrated in the example of FIG. 3 may also be configured to be coupled to an aperture 305 of chock track 118. For example, ratchet mandrel 124 may be coupled to a second aperture 305 on a second side of the tire of the vehicle, such as tire 116a and/or tire 116b. Ratchet mandrel 124 is generally operable to tighten strap 120 around a portion of a tire of a vehicle and may be used to secure another end of strap 120 to chock track 118.

Ratchet mandrel 124 may include a slot for receiving strap 120 after strap 120 is placed over the treads of a tire, such as tire 116a and/or tire 116b. An end of strap 120 may be fed through the slot in ratchet mandrel 124. The slot allows for the end of strap 120 to be pulled through, slack taken up and adjusted to length. The strap is then tightened by rotating ratchet mandrel 124, and wrapping strap 120 upon itself creates friction so that the strap cannot be pulled out of the slot. In certain embodiments, the slot may be widened in the cross car direction to allow the centerline of strap 120 to vary cross-car. This, alone or in combination with the increased distance between the strap guides on anchor mandrel 122 described may advantageously enable the operator to install strap 120 into the tread of tire 116 and to better center the strap on the tire treads. The slot may be extended any suitable length. For example, in certain embodiments the slot may be extended 1" or 2" or some other distance in either direction or just outboard toward the chock track sidewall.

Thus, system 300 may secure vehicles of different widths and sizes to deck 108 of transport 102. In particular, as illustrated in FIG. 3, a tire 116a of a first vehicle 103 (e.g., a truck, SUV, etc.) may be larger than a tire 116b of a second vehicle 103 (e.g., a compact car, sedan, etc.).

As described above, AAR loading rules state that the vehicle's tire sidewall must not be any closer than ½" from the track sidewall with the optimum spacing of 2" from the track sidewall, which works well for medium and large sized tires. Vehicles are often parked off center, however, to allow for driver's egress by increasing the driver's door swing clearance. Vehicles with narrow tires using these AAR loading rules or parked off center often have the strap installed off the center of the tire treads and sometimes on the shoulder of the tire treads.

Figure 4:
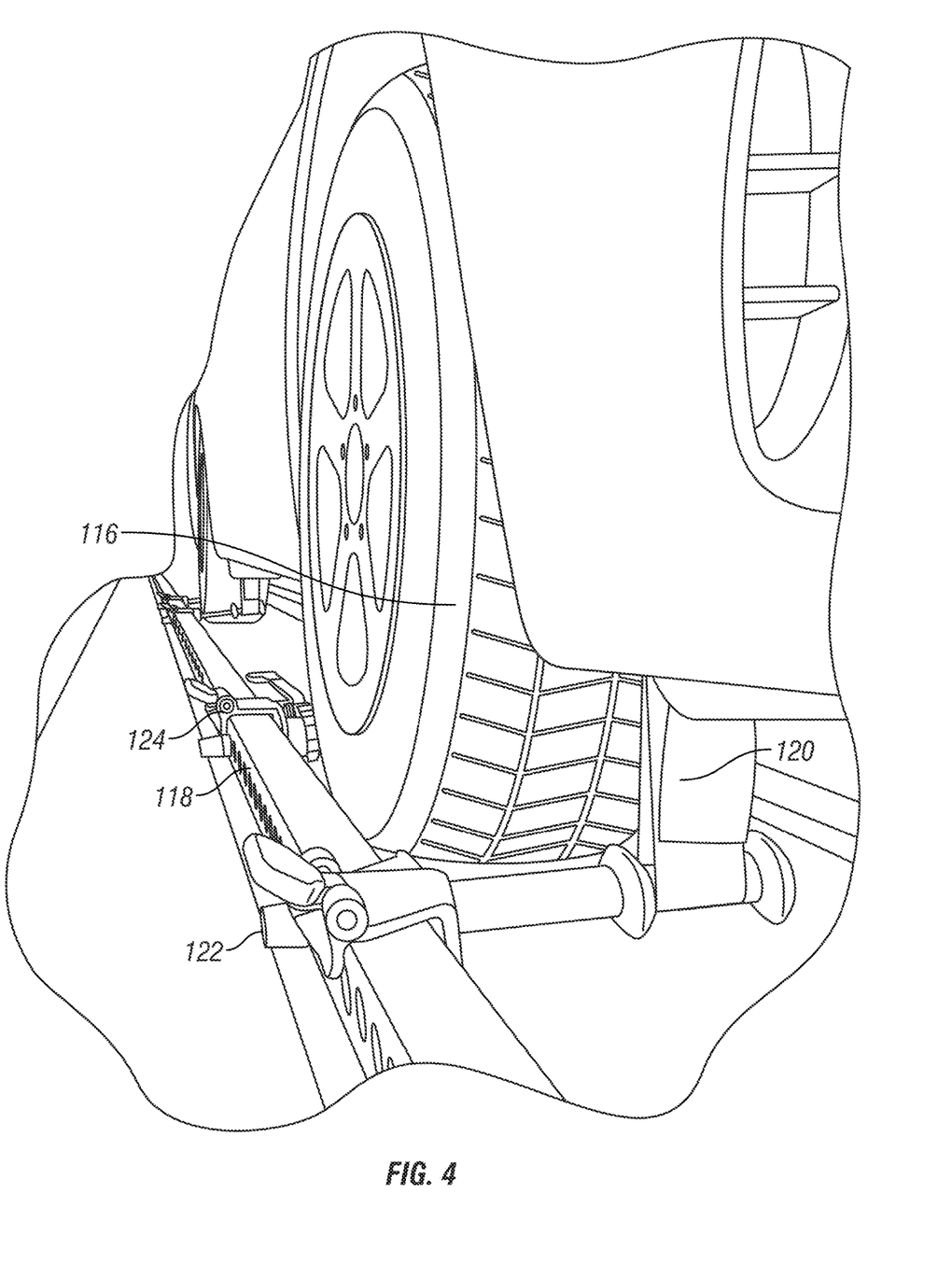
FIG. 4 illustrates an example scenario in which a strap is installed off-center.

FIG. 4 illustrates an example scenario in which a strap has been installed off-center. More particularly, FIG. 4 illustrates an example in which the tire is located too close to chock track 118. As a result, strap 120 is located off-center. The shoulder of the tire tread has a radius which may cause strap 120 to slip off from movement developed during transportation. Strap 120 may also be equipped with rubber cleats that engage the treads of tire 116 to restrain tire 116 in the cross car direction and to prevent strap 120 from pulling off tire 116 in case of impact force induced yawing or truck hunting induced side to side motion. Often, these cleats are not engaged into a tire tread since the location of the centerline of strap 120 is fixed, and the vehicle cross car position varies. In scenarios where strap 120 is positioned on the shoulder of tire 116 or the cleats of strap 120 are not inserted into a tread of tire 116, strap 120 may be worked off the tire tread easier.

FIG. 4 illustrates strap 120 installed too close to an interior portion of tire 116. Although not illustrated, the tire on the opposite side of the vehicle may have strap 120 installed too close to an exterior portion of tire 116, which may experience the same problems as the illustrated example.

Figure 5:
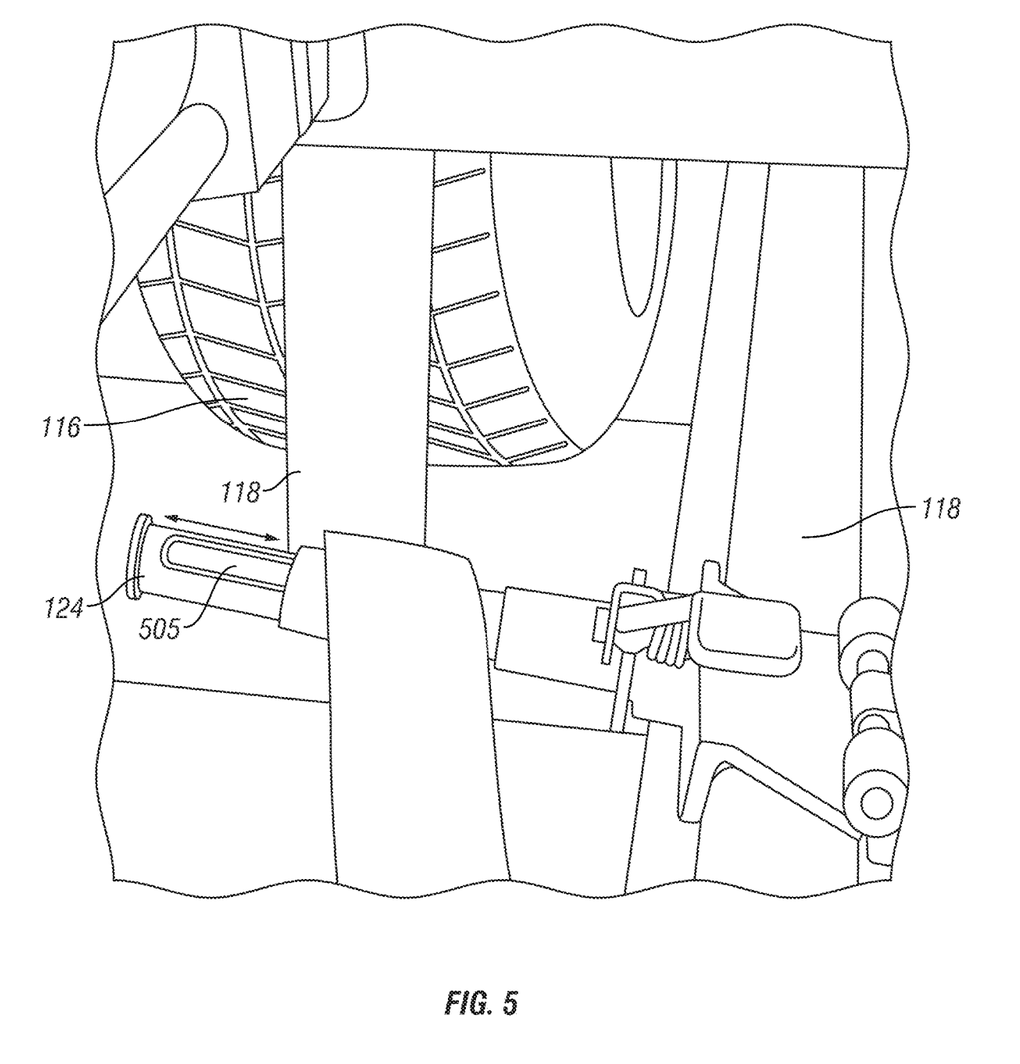
FIG. 5 illustrates an example ratchet mandrel with an extended slot, in accordance with certain embodiments.

FIG. 5 illustrates an example ratchet mandrel with an extended slot, in accordance with certain embodiments. More particularly, FIG. 5 illustrates chock track 118 to which ratchet mandrel 124 has been coupled (e.g., via one or more holes in chock track 118, such as apertures 305 described above with respect to FIG. 3), for example using a locking pin. Ratchet mandrel 124 includes slot 505 for receiving strap 120.

In certain embodiments, slot 505 of ratchet mandrel 124 is widened in the cross-car direction to allow the strap's centerline to vary cross-car to enable the operator to install strap 120 into the tread of tire 116 to better center strap 120 on the tire treads (see arrow in FIG. 5 illustrating side-to-side movement of strap 120 in slot 505). Slot 505 may be extended any suitable distance. For example, in certain embodiments slot 505 may be extended one to two inches or some other distance in either direction. Slot 505 may be extended some multiple of the width of strap 120 (e.g., 1.5 times the width of the strap, 2 times the width of the strap, etc.). As a particular example, strap 120 may comprise a 4 inch wide strap and slot 505 may be 8 inches in width. Particular embodiments may include any suitable width strap and slot according to the type of vehicles being transported. In certain embodiments, slot 505 may be extended in only the outboard direction toward the sidewall of chock track 118.

Although the example embodiment of FIG. 5 illustrates a single strap 120, the present disclosure contemplates the use of any suitable number of straps 120. For example, by extending slot 505 as described above, it may be possible to use two straps 120 positioned side-by-side on tire 116. In such a scenario, the two straps may run parallel to each other. The use of two straps 120 may advantageously provide extra tread cleats and double the friction against the tread of tire 116.

Figure 6:
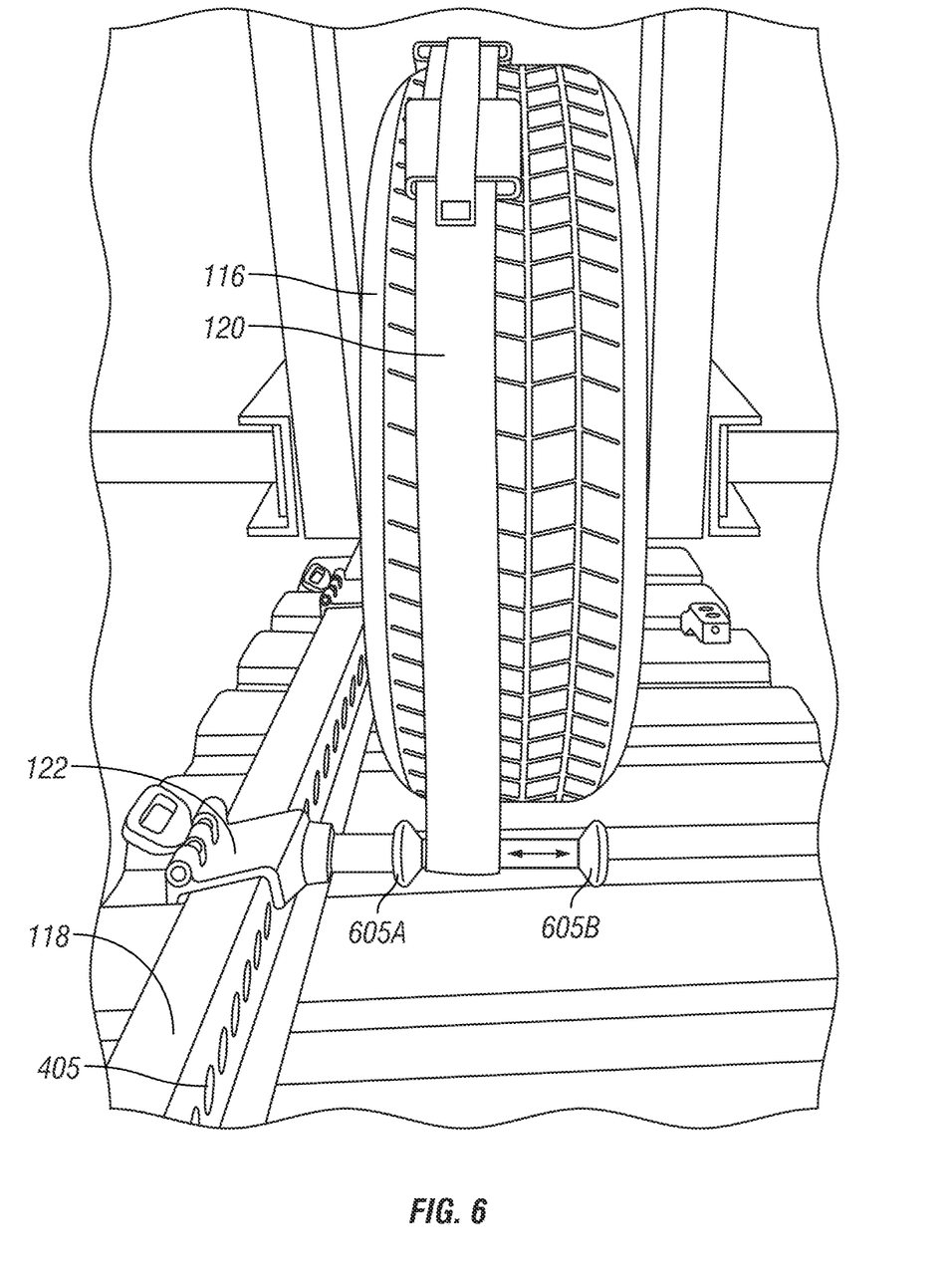
FIG. 6 illustrates an example anchor mandrel, in accordance with certain embodiments.

FIG. 6 illustrates an example anchor mandrel, in accordance with certain embodiments. More particularly, FIG. 6 illustrates anchor mandrel 122 coupled to chock track 118 via apertures 305, for example using a locking pin. One end of strap 120 is affixed to anchor mandrel 122. A portion of strap 120 has been positioned on tire 116. Anchor mandrel 122 includes two strap guides 605A and 605B (which may be interchangeably referred to herein as strap keepers 605A and 605B). Strap guides 605A and 605B may be formed from any suitable material. For example, in certain embodiments strap guides 605A and 605B may be formed from rubber.

In the example of FIG. 6, strap 120 is shown positioned off-center of tire 116. As described above with respect to FIG. 4, such a placement of strap 120 may not be desirable. In certain embodiments, the distance between strap guides 605A and 605B is increased to allow strap 120 on anchor mandrel 122 to move (e.g., slide) on anchor mandrel 122 (see arrow in FIG. 6 illustrating side-to-side movement of strap 120 between strap guides 605A and 605B). As a result of the increased distance between strap guides 605A and 605B, an operator utilizing the vehicle restraint system described herein may vary the positioning of strap 120 by sliding strap 120 on anchor mandrel 122 to enable strap 120 to be installed in the tire's tread and to center strap 120 on the tire treads of tire 116.

Figure 7:
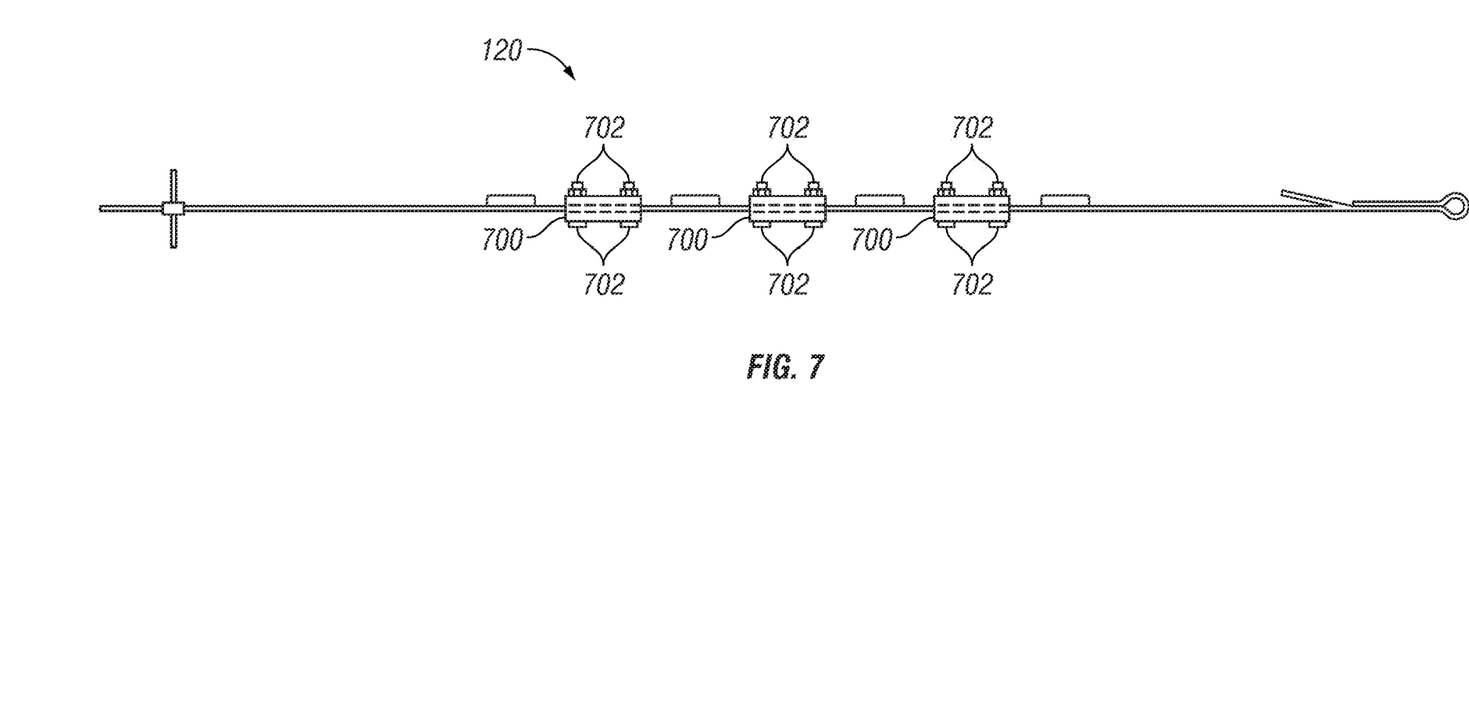
FIG. 7 illustrates a side view of an example strap of a system for restraining a vehicle in accordance with an embodiment of the present disclosure.

FIG. 7 illustrates a side view of an example strap of a system for restraining a vehicle in accordance with an embodiment of the present disclosure. As described above, strap 120 may facilitate securing a vehicle 103 to a deck 108. In particular, strap 120 may be configured to be positioned on a portion of a tire 116 of a vehicle 103 to secure tire 116 of vehicle 103 to deck 108. Example straps 120 may be composed of one or more of nylon, rubber, cloth, and/or any other suitable material. In certain embodiments, a first end of strap 120 may be coupled to anchor mandrel 122 and a second end of strap 120 may be coupled to ratchet mandrel 124.

According to the illustrated embodiment, strap 120 may be a reversible strap (e.g., double-sided) and may include cleats 700. Example cleats 700 may be composed of one or more of polymer, rubber, and/or any other suitable material. Each cleat 700 may have raised fins 702 located on both sides of the cleat. Fins 702 generally are configured to be inserted into the tread of a tire 116 to prevent strap 120 from sliding off of tire 116.

Although particular examples of strap 120 have been described, the present disclosure contemplates any suitable strap 120 comprising any suitable components configured in any suitable manner, according to particular needs. In addition, any component of strap 120 may be separate from or integral to any other component of strap 120 and strap assembly 106.

In summary, the teachings of the present disclosure relate to a system and method for restraining a vehicle. In certain embodiments, the size of a slot in a ratchet mandrel of a vehicle restraint system is increased to allow a strap's centerline to vary cross-car. In certain embodiments, a distance between strap guides of an anchor mandrel is increased to facilitate the strap on the anchor mandrel to slide cross-car a corresponding amount, to enable an operator to install the strap into a tire's tread and to better center the strap on the tire treads. In certain embodiments, the slot may be extended one or two inches, or any other suitable distance in either direction or outboard toward the chock track's sidewall.

Certain embodiments may have one or more technical advantages. As one example, certain embodiments may advantageously facilitate applying the strap to tires of varying sizes. As another example, certain embodiments may facilitate placing the strap away from the shoulder of the tire tread and enable the strap cleats to be placed into the tread. As still another example, certain embodiments may result in a greater force being required to cause the strap to slip off of the tire, which may advantageously keep the vehicle restrained during shipping. As yet another example, certain embodiments may no longer require vehicle loading to be as precise. Other technical advantages may be readily apparent to one of ordinary skill in the art. While specific advantages have been enumerated above, certain embodiments of the invention may include all, some, or none of the enumerated advantages.

Teachings of the present disclosure may be satisfactorily used to facilitate restraining one or more vehicles to one or more decks of a transport. Modifications, additions, or omissions may be made to the systems described herein without departing from the scope of the present disclosure. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the present disclosure. For example, the steps may be combined, modified, or deleted where appropriate, and additional steps may be added. Additionally, the steps may be performed in any suitable order without departing from the scope of the present disclosure.

Although embodiments of the present disclosure and their advantages have been described in detail, it should be understood that various changes, substitutions and alternations can be made herein without departing from the spirit and scope of the present disclosure as defined by the following claims. Moreover, although particular embodiments have been described herein, a myriad of changes, variations, alterations, transformations, substitutions, and modifications may be suggested to one skilled in the art, and it is intended that the present disclosure encompass such changes, variations, alterations, transformations, substitutions, and modifications as fall within the scope of the appended claims. For example, although particular embodiments of the disclosure have been described with reference to a number of elements included in a system for restraining a vehicle, these elements may be combined, rearranged or positioned in order to accommodate particular storage requirements or needs. Various embodiments contemplate great flexibility in the vehicle restraint system and its components. Additionally, while some embodiments are described with respect to an autorack, particular embodiments may be used for any type of transport.

The invention claimed is:

1. A wheel restraint system comprising:

a chock track coupled to a deck of a vehicle transport;

an anchor mandrel coupled to the chock track on a first side of a vehicle tire and extending from the chock track towards a center of the vehicle transport, the anchor mandrel comprising a pair of strap guides;

a ratchet mandrel coupled to the chock track on a second side of the vehicle tire and extending from the chock track towards the center of the vehicle transport, the ratchet mandrel comprising a ratchet for applying a rotational force to the ratchet mandrel and a slot for receiving a strap;

a first strap comprising a first end coupled to the anchor mandrel between the pair of strap guides and comprising a second end configured to be inserted into the slot of the ratchet mandrel and a second strap comprising a first end coupled to the anchor mandrel between the pair of strap guides and comprising a second end configured to be inserted into the slot of the ratchet mandrel, wherein applying a rotational force to the ratchet mandrel produces a tightening force that tightens the first strap and the second strap around a portion of the vehicle tire; and wherein a distance between the pair of strap guides of the anchor mandrel and a width of the slot of the ratchet mandrel are greater than a combined width of the first strap and the second strap, facilitating side-to-side movement of the first strap and the second strap with respect to the vehicle tire before the first strap and the second strap are tightened around the portion of the vehicle tire.

2. The wheel restraint system of claim 1, further comprising a cleat coupled to at least one of the first strap and the second strap, the cleat configured to engage with a tread of the vehicle tire when the at least one of the first strap and the second strap are is tightened around the portion of the vehicle tire.

3. The wheel restraint system of claim 1, wherein the width of the slot of the ratchet mandrel is 1.5 times as wide as the combined width of the first strap and the second strap.

4. The wheel restraint system of claim 1, wherein the width of the slot of the ratchet mandrel is twice as wide as the combined width of the first strap and the second strap.

5. The wheel restraint system of claim 1, wherein when the first strap and the second strap are tightened around the portion of the vehicle tire, side-to-side movement of the first strap and the second strap is restricted.

* * * * *